United States Patent

Shpunt et al.

(10) Patent No.: US 9,554,122 B2
(45) Date of Patent: *Jan. 24, 2017

(54) OPTICAL PATTERN PROJECTION

(71) Applicant: APPLE INC., Cupertino, CA (US)

(72) Inventors: Alexander Shpunt, Portola Valley, CA (US); Benny Pesach, Rosh Ha'ayin (IL)

(73) Assignee: APPLE INC., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/955,066

(22) Filed: Dec. 1, 2015

(65) Prior Publication Data

US 2016/0100155 A1    Apr. 7, 2016

Related U.S. Application Data

(63) Continuation of application No. 13/734,980, filed on Jan. 6, 2013, now Pat. No. 9,239,467, which is a
(Continued)

(51) Int. Cl.

| *G02B 5/18* | (2006.01) |
|---|---|
| *H04N 13/02* | (2006.01) |
| *G01B 11/25* | (2006.01) |
| *G02B 27/00* | (2006.01) |
| *G02B 27/09* | (2006.01) |
| *G02B 27/42* | (2006.01) |
| *G03B 35/00* | (2006.01) |
| *G06K 9/20* | (2006.01) |
| *G02B 27/10* | (2006.01) |

(52) U.S. Cl.
CPC ........... *H04N 13/0271* (2013.01); *G01B 11/25* (2013.01); *G02B 5/1819* (2013.01); *G02B 27/0037* (2013.01); *G02B 27/0944* (2013.01); *G02B 27/42* (2013.01); *G02B 27/425* (2013.01); *G02B 27/4244* (2013.01); *G02B 27/4272* (2013.01); *G02B 27/4277* (2013.01); *G03B 35/00* (2013.01); *G06K 9/2036* (2013.01); *H04N 13/0253* (2013.01); *G02B 27/1086* (2013.01)

(58) Field of Classification Search
CPC ......... G02B 27/42; G02B 27/425; G02B 5/18; G02B 5/1819
USPC ........................................ 359/565, 569, 576
See application file for complete search history.

(56) References Cited

U.S. PATENT DOCUMENTS

| 5,029,243 A | 7/1991 | Dammann et al. |
|---|---|---|
| 5,113,286 A | 5/1992 | Morrison |

(Continued)

FOREIGN PATENT DOCUMENTS

| EP | 1001413 A2 | 5/2000 |
|---|---|---|
| WO | 9418582 A1 | 8/1994 |

OTHER PUBLICATIONS

JP Patent Application # 2014-86823 Office Action dated Mar. 22, 2016.

(Continued)

*Primary Examiner* — Audrey Y Chang
(74) *Attorney, Agent, or Firm* — D.Kligler IP Services Ltd.

(57) ABSTRACT

Optical apparatus includes first and second diffractive optical elements (DOEs) arranged in series to diffract an input beam of radiation. The first DOE is configured to apply to the input beam a pattern with a specified divergence angle, while the second DOE is configured to split the input beam into a matrix of output beams with a specified fan-out angle. The divergence and fan-out angles are chosen so as to project the radiation onto a region in space in multiple adjacent instances of the pattern.

16 Claims, 2 Drawing Sheets

Related U.S. Application Data continuation of application No. 12/840,312, filed on Jul. 21, 2010, now Pat. No. 8,384,997, which is a continuation-in-part of application No. 12/330,766, filed on Dec. 9, 2008, now abandoned.

(60) Provisional application No. 61/229,749, filed on Jul. 30, 2009, provisional application No. 61/022,482, filed on Jan. 21, 2008.

(56) References Cited

U.S. PATENT DOCUMENTS

| | | | |
|---|---|---|---|
| 5,243,583 A | 9/1993 | Ohuchida et al. | |
| 5,477,383 A * | 12/1995 | Jain | G02B 3/0056 359/565 |
| 5,742,262 A * | 4/1998 | Tabata | G02B 27/0081 345/8 |
| 8,384,997 B2 * | 2/2013 | Shpunt | G01B 11/25 359/569 |
| 9,239,467 B2 * | 1/2016 | Shpunt | G02B 27/42 359/569 |
| 2005/0088951 A1 | 4/2005 | Fukasawa et al. | |
| 2007/0223093 A1 | 9/2007 | Ushiro et al. | |

OTHER PUBLICATIONS

European Application # 08871178.3 Search Report dated Mar. 29, 2016.

European Application # 08871178.3 Search Report dated Oct. 30, 2015.

* cited by examiner

OPTICAL PATTERN PROJECTION

CROSS-REFERENCE TO RELATED APPLICATION

This application is a continuation of U.S. patent application Ser. No. 13/734,980, filed Jan. 6, 2013, which is a continuation of U.S. patent application Ser. No. 12/840,312, filed Jul. 21, 2010 (now U.S. Pat. No. 8,384,997), which claims the benefit of U.S. Provisional Patent Application 61/229,749, filed Jul. 30, 2009, and is a continuation-in-part of U.S. patent application Ser. No. 12/330,766, filed Dec. 9, 2008, and published as US 2009/0185274, which claims the benefit of U.S. Provisional Patent Application 61/022,482, filed Jan. 21, 2008. The disclosures of all of these related applications are incorporated herein by reference.

FIELD OF THE INVENTION

The present invention relates generally to optical systems and designs, and specifically to methods and system for optical pattern projection.

BACKGROUND OF THE INVENTION

Optical pattern projection is used in a variety of applications, such as optical three-dimensional (3D) mapping, area illumination, and LCD backlighting. In some applications, diffractive optical elements (DOEs) are used in creating a desired projection pattern.

Various methods are known in the art for designing DOEs. In some of these methods, the DOE is designed as a phase mask, which corresponds, in effect, to a Fourier transform of the far-field amplitude pattern that the DOE is to project. A method for computing such phase masks is described, for example, by Gerchberg and Saxton in "A Practical Algorithm for the Determination of the Phase from Image and Diffraction Plane Pictures," *Optik* 35 (1972), pages 237-246, which is incorporated herein by reference. Fienup reviews computational approaches that may be used in designing phase-mask DOEs in "Phase Retrieval Algorithms: A Comparison," *Applied Optics* 21, 2758-2769 (1982), which is also incorporated herein by reference.

Sazbon et al. describe how the Gerchberg-Saxton algorithm may be used in designing a DOE for use in range estimation, in "Qualitative Real-Time Range Extraction for Preplanned Scene Partitioning Using Laser Beam Coding," *Pattern Recognition Letters* 26 (2005), pages 1772-1781, which is also incorporated herein by reference.

SUMMARY

Embodiments of the present invention that are described hereinbelow provide improved methods and apparatus for projection of optical patterns using DOEs.

There is therefore provided, in accordance with an embodiment of the present invention, optical apparatus, including first and second diffractive optical elements (DOEs) arranged in series to diffract an input beam of radiation. The first DOE is configured to apply to the input beam a pattern with a specified divergence angle, while the second DOE is configured to split the input beam into a matrix of output beams with a specified fan-out angle. The divergence and fan-out angles are chosen so as to project the radiation onto a region in space in multiple adjacent instances of the pattern.

In some embodiments, the divergence and fan-out angles are chosen so that the multiple adjacent instances of the pattern tile the region. In one such embodiment, the divergence angle of each instance of the pattern is $2\beta_{Tile}$, and the fan-out angle between the adjacent instances is $\beta_{FO}$, and the divergence and fan-out angles are chosen so that $\sin(\beta_{FO})=2\sin(\beta_{Tile})$. Typically, the first and second DOEs are configured so that the multiple adjacent instances of the pattern tile the region irrespective of a wavelength of the input beam. Additionally or alternatively, each of the multiple adjacent instances includes multiple diffraction orders, including respective extreme orders, and the extreme orders of neighboring instances are mutually adjacent in a spatial frequency space.

In a disclosed embodiment, the pattern includes an uncorrelated pattern of spots.

The second DOE may be configured to distribute an energy of the input beam among the output beams in accordance with a predefined non-uniform distribution.

Typically, a diffraction pattern of the apparatus includes a zero-order component, and the first and second DOEs are configured to diffract the input beam so that the zero-order component contains no more than 1% of an energy of the input beam.

In one embodiment, the matrix of the output beams includes at least a 3×3 matrix.

There is also provided, in accordance with an embodiment of the present invention, mapping apparatus, including a projection subassembly, which includes a radiation source, which is configured to generate an input beam of radiation. First and second diffractive optical elements (DOEs) are arranged in series to diffract the input beam, wherein the first DOE is configured to apply to the input beam a pattern with a specified divergence angle, while the second DOE is configured to split the input beam into a matrix of output beams with a specified fan-out angle, so as to project the radiation onto a region in space. An image capture subassembly is configured to capture an image of the pattern appearing on an object in the region. A processor is configured to process the image so as to produce a three-dimensional (3D) map of the object.

There is additionally provided, in accordance with an embodiment of the present invention, a method for projection, including directing an input beam of radiation to pass in series through first and second diffractive optical elements (DOEs), wherein the first and second DOEs are configured as described above.

The present invention will be more fully understood from the following detailed description of the embodiments thereof, taken together with the drawings in which:

DETAILED DESCRIPTION OF EMBODIMENTS

Figure 1:
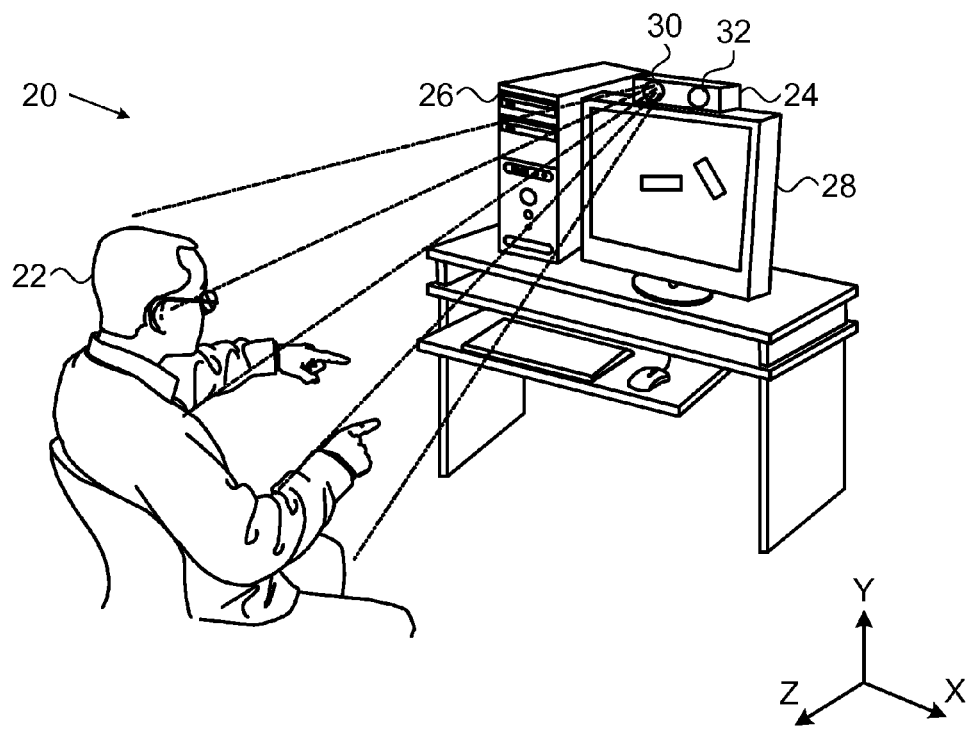
FIG. 1 is a schematic, pictorial illustration of a system for optical 3D mapping, in accordance with an embodiment of the present invention.

The above-mentioned U.S. Patent Application Publication 2009/0185274 describes an optical design in which a first DOE diffracts an input beam so as to generate a first diffraction pattern on a first region of a surface. A second DOE diffracts the zero-order beam of the first diffraction pattern so as to generate a second diffraction pattern on a second region of the surface, such that the first and the second regions together at least partially cover the surface.

In an alternative embodiment, the first diffraction pattern comprises a plurality of substantially collimated beams. The second DOE serves as a pattern generator, to diffract each of the beams to form a respective diffraction pattern. Each diffraction pattern projects onto a respective region of a surface so as to at least partially cover the surface, and the regions may tile the surface. The terms "first" and "second" are used solely for convenience in referring to the DOEs, and in practice the input beam may pass through the two DOEs in any order—"first" then "second," or vice versa.

In the specification and in the claims of the present patent application, a "tiling" of a region (whether a planar region or a region in space) with a pattern means that the region is covered by multiple adjacent instances ("tiles") of the pattern, without substantial overlaps or gaps between the instances. When the pattern is made up of spots, as in the embodiments described below, "substantial" means that the gaps and overlap between adjacent tiles are no greater than a small, predetermined number times the average dimension of the spots in the pattern. The number depends on application requirements, and is typically between one and five. In embodiments of the present invention that are described hereinbelow, appropriate design and fabrication of the DOEs can yield tiling with gaps and/or overlap no greater than twice the average spot dimension, or even no greater than the average spot dimension itself.

In some embodiments of the present invention, DOEs of the types described above are used to project a pattern onto an object for purposes of 3D mapping. In the present patent application and in the claims, the term "3D map" (or equivalently, "depth map") refers to a set of 3D coordinates representing the surface of the object. The creation of such a map based on image data is referred to herein as "3D mapping" (or equivalently, "3D reconstruction"). Methods and systems for 3D mapping based on projected patterns are described, for example, in PCT International Publications WO 2007/043036, WO 2007/105205, WO 2008/120217, and WO 2010/004542, whose disclosures are incorporated herein by reference. DOEs designed in accordance with embodiments of the present invention have advantages, in this context, of covering a large mapping region with a pattern of high quality and well-controlled intensity, so that depth values may be found reliably over the entire region. This intensity control is important particularly in ensuring that the intensity is within eye safety limits when the region to be mapped includes human beings. Embodiments of the present invention inherently provide beneficial safety margins of this sort.

FIG. 1 is a schematic, pictorial illustration of a system 20 for optical 3D mapping, in accordance with an embodiment of the present invention. System 20 comprises an imaging device 24, comprising a projection subassembly 30, which generates and projects a pattern onto a region. In the pictured example, this region contains a human user 22 of the system. Details of the design and operation of projection subassembly 30 are shown in the figures that follow and are described hereinbelow with reference thereto.

An image capture subassembly 32 in device 24 captures an image of the pattern appearing on user 22. An image processor 26 processes image data generated by device 24 in order to reconstruct a 3D map of user 22. Image processor 26 computes the 3D coordinates of points on the surface of the user's body by triangulation, based on the transverse shifts of the spots in an image of the pattern that is projected onto the object relative to a reference pattern at a known distance from device 24. Methods for this sort of triangulation-based 3D mapping, as well as further details relevant to the construction and operation of device 24, are described in the above-mentioned PCT publications. Alternatively, the types of DOEs and design techniques that are described hereinbelow may be used in other sorts of depth mapping systems, not necessarily triangulation-based. More generally, such DOEs and techniques can be used in substantially any application requiring eye-safe projection of DOE-based patterns.

Image processor 26 may comprise a general-purpose computer processor, which is programmed in software to carry out the functions described hereinbelow. The software may be downloaded to processor 26 in electronic form, over a network, for example, or it may alternatively be provided on tangible storage media, such as optical, magnetic, or electronic memory media. Alternatively or additionally, some or all of the functions of the image processor may be implemented in dedicated hardware, such as a custom or semi-custom integrated circuit or a programmable digital signal processor (DSP). Although processor 26 is shown in FIG. 1, by way of example, as a separate unit from imaging device 24, some or all of the processing functions of processor 26 may be performed by suitable dedicated circuitry within the housing of imaging device 24 or otherwise associated with the imaging device.

The 3D map that is generated by processor 26 may be used for a wide range of different purposes. For example, the map may be used to provide a gesture-based user interface, in which user movements detected by means of device 24 control an interactive computer application, such as a game, and interact with objects shown on a display 28. Alternatively, system 20 may be used to create 3D maps of objects of other types, for substantially any application in which 3D coordinate profiles are needed.

In some embodiments, projection subassembly 30 projects an uncorrelated pattern of spots onto a given field of view. In the context of the present patent application and in the claims, the term "uncorrelated pattern" refers to a projected pattern of spots (which may be bright or dark), whose positions are uncorrelated in planes transverse to the projection beam axis. The positions are uncorrelated in the sense that the auto-correlation of the pattern as a function of transverse shift is insignificant for any shift larger than the spot size and no greater than the maximum shift that may occur over the range of depths mapped by the system. Random and pseudo-random patterns are uncorrelated in this sense. Synthetic patterns, created by human or computer design, such as quasi-periodic patterns, may also be uncorrelated to the extent specified by the above definition. Alternatively, the projection assembly and the DOE arrangements that are described hereinbelow may be used to project patterns of other sorts, not necessarily uncorrelated.

Figure 2:
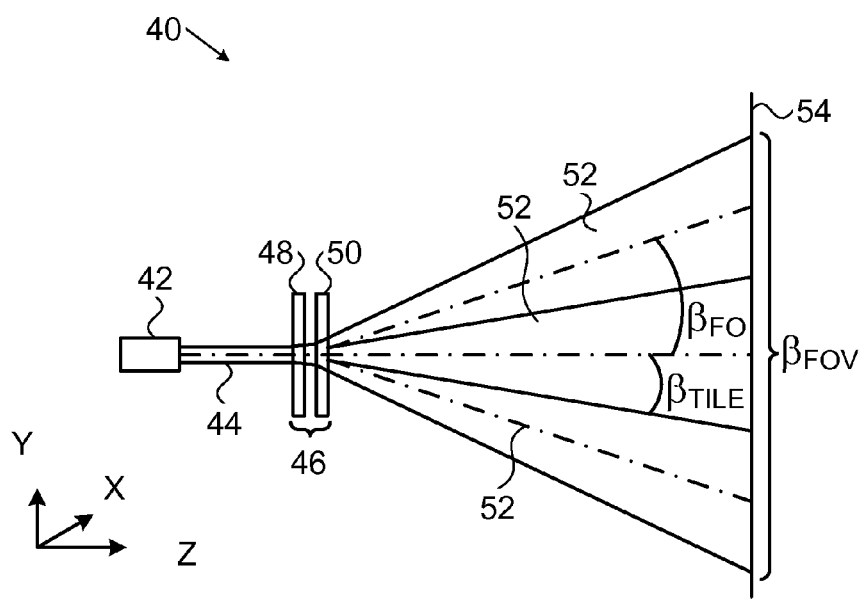
FIG. 2 is a schematic side view of a projection assembly, in accordance with an embodiment of the present invention.

FIG. 2 is a schematic side view of a projection assembly 40, in accordance with an embodiment of the present invention. Assembly 40 may be used, for example, as part of projection subassembly 30 in imaging device 24 (FIG. 1). Assembly 40 comprises a light source 42, such as a laser diode, which generates and projects an input beam 44 of radiation (possibly collimated) via optics 46 onto a surface 54. Optics 46 generate a pattern on the surface, as described further hereinbelow. Although surface 54 is shown in the figures, for the sake of simplicity, as a planar surface, the pattern is projected by the optics through a region in space, and will thus cover an irregular surface of an object within the beam area.

Optics 46 in the embodiment of FIG. 2 comprise two elements 48, 50, which typically comprise DOEs. Each DOE comprises a active optical surface, which is etched, molded or deposited on a suitable substrate, using methods known in the art. The active surfaces may be on either side of elements 48 and 50. In one embodiment, both active surfaces face toward light source 42 (on the left sides of the respective substrates in the pictured embodiment). Alternatively, the two active surfaces may be formed on opposing sides of the same substrate, in which case a single optical component comprises, in effect, two DOEs. Further alternatively or additionally, the left/right order of the elements may be reversed, so that beam 44 strikes element 50 before element 48. In the context of the present patent application and in the claims, either order of the elements—element 48 before element 50 or vice versa—is considered to be an arrangement of elements 48 and 50 "in series" to diffract the input beam.

Element 48 applies a certain pattern to input beam 44, such as an uncorrelated pattern for use in the 3D mapping application described above. In order to project the pattern onto surface 54 over a wide angular range, element 50 splits the beam into a fanned-out matrix of output beams 52. In the pictured example, element 50 creates nine beams, in a 3×3 fan-out. Alternatively, element 50 may be designed to give other fan-out patterns, such as 5×5, 7×7, or patterns with unequal numbers of beams in the vertical and horizontal directions.

Together, elements 48 and 50 project a pattern over a field of view (FOV) with full angular extent $\alpha_{FOV}$ in the horizontal direction and $\beta_{FOV}$ in the vertical (which is shown in the side view of FIG. 2). Element 50 spreads output beams apart with fan-out angles $\alpha_{FO}$ (horizontal) and $\beta_{FO}$ (vertical) between adjacent beam axes. Each beam carries an instance of the pattern generated by element 48, with full divergence angles $2\alpha_{Tile}$ (horizontal) and $2\beta_{Tile}$ (vertical). In the 3×3 fan-out example shown in the figures, with pattern instances in beams 52 that are mutually adjacent:

$$\alpha_{FOV} = 2 \arcsin(\sin(\alpha_{FO}) + \sin(\alpha_{Tile})), \text{ and} \tag{1a}$$

$$\beta_{FOV} = 2 \arcsin(\sin(\beta_{FO}) + \sin(\beta_{Tile})). \tag{1b}$$

These relations may be modified in a straightforward manner for other tiling schemes. For example, for (2n+1)×(2n+1) tiling:

$$\alpha_{FOV} = 2 \arcsin(n^*\sin(\alpha_{FO}) + \sin(\alpha_{Tile})), \text{ and} \tag{2a}$$

$$\beta_{FOV} = 2 \arcsin(n^*\sin(\beta_{FO}) + \sin(\beta_{Tile})). \tag{2b}$$

Figure 3:
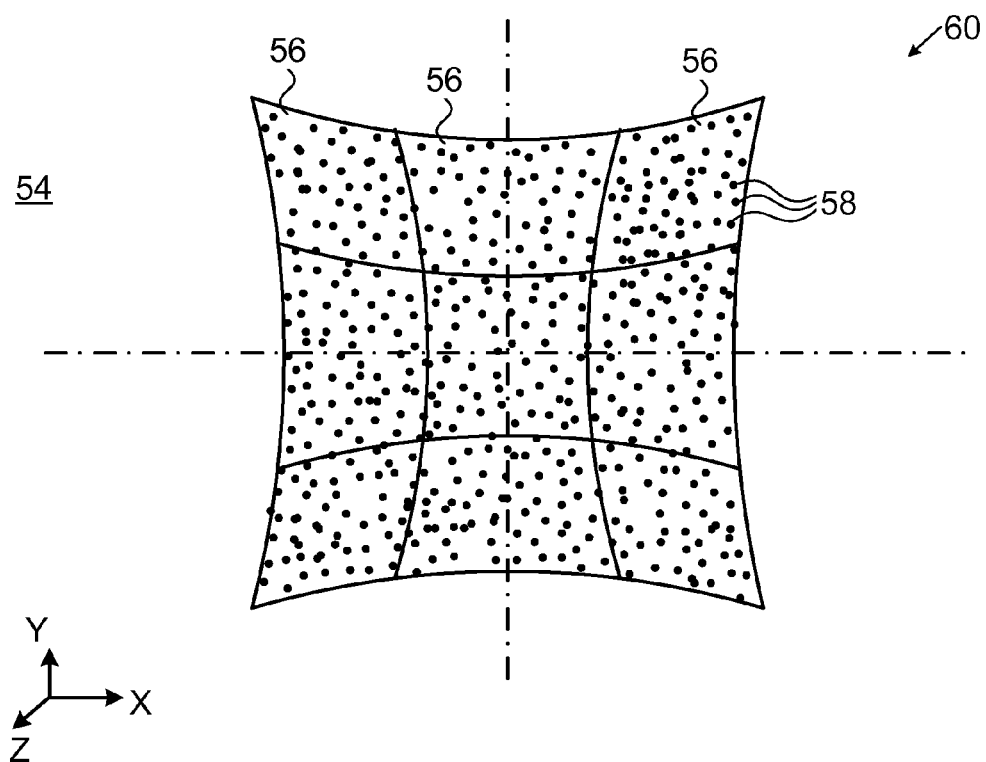
FIG. 3 is a schematic frontal view of a plane illuminated using the assembly of FIG. 2, in accordance with an embodiment of the present invention.

FIG. 3 is a schematic frontal view of a pattern 60 that is projected on surface 54 by assembly 40, in accordance with an embodiment of the present invention. Pattern 60 comprises multiple adjacent instances, represented by tiles 56, of the pattern generated by element 48. Each tile 56 is formed by a respective beam 52 and comprises a predefined distribution of light spots 58 on a dark background (with light and dark reversed in the figure for clarity of representation). The DOEs of elements 48 and 50 are designed so that tiles 56 precisely tile plane 54. In other words, the tiles meet along their edges without substantial gaps or overlap.

Element 48 is typically designed to give an approximately uniform density of spots in each tile 56. In order to avoid problems due to overlap of the tile edges, the spot pattern may be tailored to remove spots in certain positions immediately adjacent to the tile edge that are likely to overlap spots near the edge of the neighboring tile.

Referring back to FIG. 2, the divergence angles $2\alpha_{Tile}$ and $2\beta_{Tile}$ refer to the effective angular outer limits of the pattern cast by a single output beam 52 onto the corresponding tile 56. There will always be some energy in the output beam that escapes the confines of the tile, but element 48 may be designed to limit this stray energy to an insignificant level, i.e., a level that does not substantially affect the performance of the application, such as 3D mapping, for which the pattern is projected. Typically, more than 80% of the energy in a given output beam is contained within the specified divergence angles, but larger or smaller limits may be applied depending on application requirements and manufacturing and design constraints.

The phase mask of element 50 comprises a periodic pattern of repeating cells. The dimensions of the cells in the pattern control the fan-out angle between tiles 56, which correspond to different diffraction orders of the periodic pattern. In the example shown in FIGS. 2 and 3, for the case of 3×3 tiling, the dominant spatial frequencies of the phase mask of element 50 are typically roughly twice those of element 48 along both the X and Y axes in order to give the desired relation between the specified fan-out and divergence angles.

In this manner, the tiling conditions may be translated into design considerations for the DOEs. For perfect, gapless tiling, with element 48 having (2M+1)×(2M+1) diffraction orders (some of which are off, thus creating the tile pattern), the grating period of the phase mask in element 48 will be equal to (M+0.5) times the grating period of element 50. For example, if the tile pattern is 21×21, and the grating period of element 50 is 5 μm, then the period of the unit cell in element 48 will be 10.5*5 μm=52.5 μm. The grating periods of element 50 in the X and Y axes, respectively, is determined from the total required field of view, using relations (1a), (3a) and (1b), (3b) below. The grating period of element 48 is then determined from the perfect tiling condition described here and specified by the formulas below.

The shape of the phase mask within each cell of element 50 controls the power distribution among the different output beams (diffraction orders). Thus, element 50 may be designed to give either uniform light intensity distribution among tiles 56 or a predefined non-uniform intensity distribution. For example, a larger relative share of the input beam energy (typically on the order of 15-30%) may be directed to the corner tiles in order to compensate for geometric factors and vignetting by the image capture subassembly that is used to capture images of the projected pattern. Element 50 may thus be designed to give the appropriate share of energy to each beam 52 in order to optimize system performance.

In the pictured embodiment, to provide perfect tiling within a prescribed field of view, the fan-out and divergence angles meet the constraints defined above in equations (1a) and (1b):

$$\alpha_{FOV} = 2 \arcsin(\sin(\alpha_{FO}) + \sin(\alpha_{Tile})) \tag{1a}$$

$$\beta_{FOV} = 2a \sin(\sin(\beta_{FO}) + \sin(\beta_{Tile})) \tag{1b}$$

and also satisfy the relations:

$$\sin(\alpha_{FO}) = 2 \sin(\alpha_{Tile}) \tag{3a}$$

$$\sin(\beta_{FO}) = 2 \sin(\beta_{Tile}). \tag{3b}$$

For the general case of (2n+1)×(2n+1) tiling, equations (1a) and (1b) are replaced by equations (2a) and (2b), as described above, while equations (3a) and (3b) are unchanged. DOEs satisfying these relations achieve tiling without gaps, wherein the tile borders match exactly, meaning that the extreme orders of the adjacent tiles coincide in spatial frequency space.

For some applications, a small gap is beneficial, and the above relations may be modified for this purpose. For instance, it is usually beneficial for the extreme orders in neighboring tiles to be mutually adjacent in the spatial frequency space, rather than coinciding. This sort of adjacency can be achieved using the technique described above for matching the grating periods and unit cell sizes of elements 48 and 50, including the specific example of a 5 µm grating period of element 50, 21×21 diffraction orders, and consequently a 52.5 µm unit cell size for element 48.

In practice, the ability to satisfy the relations exactly is mitigated by the tolerances of DOE mastering, production and alignment. Therefore, for the purposes of the present patent application and the claims, a pair of DOEs can be considered to satisfy the above relations if their diffraction characteristics match the angular criteria approximately, to within a tolerance dictated by application requirements. For example, in a 3D mapping application, DOEs 48 and 50 may be considered to satisfy the above relations if tiles 56 overlap by no more than a certain number of pixels, such as five pixels, in the images produced by image capture subassembly 32.

In designing assembly 40, given one of the elements (such as element 48 with a given tile divergence angle), the other element (such as element 50) can be designed using the above relations and thus provide the appropriate fan-out for the given tile. When these relations are satisfied, the tiling accuracy remains essentially unaffected by changes in the wavelength of light source 42 over the operating range of elements 48 and 50, because the tile divergence angle and the fan-out angle will increase or decrease in concert.

DOEs 48 and 50 may be designed using methods known in the art for designing phase masks, such as the methods described above in the Background section. Alternatively or additionally, rigorous design approaches such as Rigorous Coupled Wave Analysis (RCWA), can be used, as described by Moharam and Gaylord in "Rigorous coupled-wave analysis of planar-grating diffraction" *Journal of the Optical Society of America* 71:7, pages. 811-818 (1981), which is incorporated herein by reference.

The arrangement and design of optics 46 addresses the "zero-order problem" that is described in the above-mentioned US 2009/0185274: A portion of input beam 44 (the zero diffraction order) may not be diffracted by the projection optics and may thus continue through to the projection volume. In some DOE designs, the intensity of this zero-order beam may exceed eye-safety limits, particularly when laser illumination is used, and may detract from the contrast of the pattern.

The design of elements 48 and 50 overcomes this potential problem. Specifically, by dividing the input beam into multiple output beams 52, element 50 inherently reduces the fraction of the input beam that remains in the central output beam, typically to ⅑ (or less) of the input beam energy in the 3×3 example shown in the figures. Furthermore, because the tile pattern generated by element 48 has a relatively small divergence angle (much smaller than the overall field of view), the phase mask of element 48 may be controlled precisely to suppress the zero-order component. Thus, in typical embodiments, the zero-order component of the diffraction pattern of optics 46 contains no more than 1% of the energy of the input beam, and may contain substantially less. With appropriate design and manufacturing, the total zero order component from the combination of elements 48 and 50 can even be reduced below 0.1%.

It will be appreciated that the embodiments described above are cited by way of example, and that the present invention is not limited to what has been particularly shown and described hereinabove. Rather, the scope of the present invention includes both combinations and subcombinations of the various features described hereinabove, as well as variations and modifications thereof which would occur to persons skilled in the art upon reading the foregoing description and which are not disclosed in the prior art.

The invention claimed is:

1. Optical apparatus, comprising first and second diffractive optical elements (DOEs) arranged in series to diffract an input beam of radiation,
    wherein the first DOE is configured to diffract the input beam so as to generate a diffraction pattern with a specified divergence angle, while the second DOE is configured to split the input beam into a matrix of output beams with a specified fan-out angle, and
    wherein the divergence and fan-out angles are chosen so as to project the radiation onto a region in space in multiple adjacent instances of the diffraction pattern extending over respective non-rectangular areas, which tile the region,
    wherein the divergence angle of each instance of the pattern is $2\beta_{Tile}$, and the fan-out angle between the adjacent instances is $\beta_{FO}$, and wherein the divergence and fan-out angles are chosen so that $\sin(\beta_{FO})=2 \sin(\beta_{Tile})$.

2. The apparatus according to claim 1, wherein the first and second DOEs are configured so that the multiple adjacent instances of the pattern tile the region irrespective of a wavelength of the input beam.

3. The apparatus according to claim 1, wherein the second DOE is configured to distribute an energy of the input beam among the output beams in accordance with a predefined non-uniform distribution.

4. The apparatus according to claim 1, wherein a diffraction pattern of the apparatus includes a zero-order component, and wherein the first and second DOEs are configured to diffract the input beam so that the zero-order component contains no more than 1% of an energy of the input beam.

5. The apparatus according to claim 1, wherein the matrix of the output beams comprises at least a 3×3 matrix.

6. Mapping apparatus, comprising:
    a projection subassembly, comprising:
        a radiation source, which is configured to generate an input beam of radiation; and
        first and second diffractive optical elements (DOEs) arranged in series to diffract the input beam, wherein the first DOE is configured to diffract the input beam so as to generate a diffraction pattern with a specified divergence angle, while the second DOE is configured to split the input beam into a matrix of output beams with a specified fan-out angle, so as to project the radiation onto a region in space,
        wherein the divergence and fan-out angles are chosen so that the radiation is projected into multiple adjacent instances of the diffraction pattern extending over respective non-rectangular areas, which tile the region, and wherein the divergence angle of each instance of the pattern is $2\beta_{Tile}$, and the fan-out angle between the adjacent instances is $\beta_{FO}$, and wherein the divergence and fan-out angles are chosen so that $\sin(\beta_{FO})=2 \sin(\beta_{Tile})$;

an image capture subassembly, which is configured to capture an image of the pattern appearing on an object in the region; and a processor, which is configured to process the image so as to produce a three-dimensional (3D) map of the object.

7. The apparatus according to claim 6, wherein the first and second DOEs are configured so that the multiple adjacent instances of the pattern tile the region irrespective of a wavelength of the input beam.

8. The apparatus according to claim 6, wherein the second DOE is configured to distribute an energy of the input beam among the output beams in accordance with a predefined non-uniform distribution.

9. The apparatus according to claim 6, wherein a diffraction pattern of the projection subassembly includes a zero-order component, and wherein the first and second DOEs are configured to diffract the input beam so that the zero-order component contains no more than 5% of an energy of the input beam.

10. The apparatus according to claim 6, wherein the matrix of the output beams comprises at least a 3×3 matrix.

11. A method for projection, comprising:
   directing an input beam of radiation to pass in series through first and second diffractive optical elements (DOEs),
   wherein the first DOE is configured to diffract the input beam so as to generate a diffraction pattern with a specified divergence angle, while the second DOE is configured to split the input beam into a matrix of output beams with a specified fan-out angle, and
   wherein the divergence and fan-out angles are chosen so as to project the radiation onto a region in space in multiple adjacent instances of the diffraction pattern extending over respective non-rectangular areas, which tile the region, and
   wherein the divergence angle of each instance of the pattern is $2\beta_{Tile}$, and the fan-out angle between the adjacent instances is $\beta_{FO}$, and wherein the divergence and fan-out angles are chosen so that $\sin(\beta_{FO})=2\sin(\beta_{Tile})$.

12. The method according to claim 11, wherein directing the input beam comprises arranging the first and second DOEs so that the multiple adjacent instances of the pattern tile the region irrespective of a wavelength of the input beam.

13. The method according to claim 11, wherein the second DOE is configured to distribute an energy of the input beam among the output beams in accordance with a predefined non-uniform distribution.

14. The method according to claim 11, wherein directing the input beam to pass through the first and second DOEs comprises generating a diffraction pattern that includes a zero-order component, and wherein the first and second DOEs are configured to diffract the input beam so that the zero-order component contains no more than 5% of an energy of the input beam.

15. The method according to claim 11, wherein the matrix of the output beams comprises at least a 3×3 matrix.

16. The method according to claim 11, and comprising capturing an image of the pattern appearing on an object in the region, and processing the image so as to produce a three-dimensional (3D) map of the object.

* * * * *